Patented Jan. 3, 1933

1,892,719

UNITED STATES PATENT OFFICE

GIUSEPPE BRUNI AND TULLIO GUIDO LEVI, OF MILAN, ITALY, ASSIGNORS TO SOCIETA ITALIANA PIRELLI, OF MILAN, ITALY

VULCANIZATION OF RUBBER

No Drawing. Application filed February 17, 1931, Serial No. 516,497, and in Italy March 3, 1930.

The copending U. S. A. patent application No. 516,496, filed February 17, 1931, is for the preparation of substituted dithiocarbamates of quaternary ammoniums, produced through the interaction of aliphatic aldehydes and dithiocarbamates of secondary bases and for use as accelerators of vulcanization of these substances.

We have there shown that these substances are very powerful ultra-accelerators, and at the same time have very little tendency to scorching. This last property permits their use in all the ordinary manufacturing operations, as mixing, calendering, forcing, etc. without the scorching inconveniences which arise with the ordinary ultra-accelerators.

We have now found another class of accelerators which are analogous to the above mentioned as well by their chemical constitution as by their vulcanizing properties. These bodies are entirely new chemical products of a type not yet known nor described in chemical literature. They are bisubstituted dithiocarbamates of completely substituted quaternary ammoniums where the four hydrogen atoms are substituted by two bivalent radicals of aliphatic aldehydes, thus corresponding to the general formula:

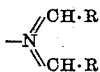

where R may represent: hydrogen H—, or an alkylic radicle, like methyl $CH_3-$, ethyl $C_2H_5-$ and thus $=CH \cdot R$ is the residue of an aliphatic aldehyde, formaldehyde included.

These substances have thus following general formula:

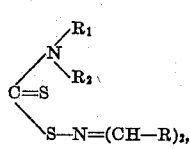

where R has the above said signification, and $R_1$ and $R_2$ are two monovalent radicles equal or different from one another. At least one among them must be an alkylic radicle, like methyl $CH_3-$ ethyl $C_2H_5-$ etc., or alkylarylic like benzyl $C_6H_5-CH_2-$. $R_1$ and $R_2$ can also be substituted by a bivalent polymethylenic chain like pentamethylene (piperidyl—) $-CH_2-CH_2-CH_2-CH_2-CH_2-$ or the like attached to the nitrogen by its free ends; one of them can be an arylic radicle like phenyl $C_6H_5-$ or tolyl $CH_3-C_6H_4-$ or an aliciclic radicle like cyclohexyl $C_6H_{11}-$.

The above substances can be prepared by the reaction of aliphatic aldehydes on the bisubstituted dithiocarbamates of ammonium, which latter in their turn can be prepared for example following the method described by Losanitsch (Berichte der deutschen Chemischen Gesellschaft, vol. 24, page 3021, year 1891).

The new reaction is expressed by the following general equation:

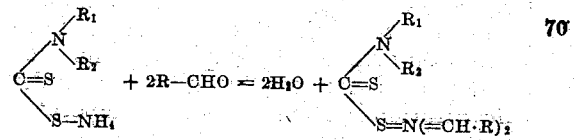

For example, when acetaldehyde reacts on dimethyldithiocarbamates of ammonium we obtain:

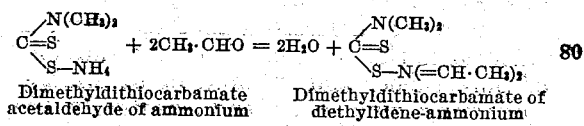

Dimethyldithiocarbamate of acetaldehyde of ammonium

Dimethyldithiocarbamate of diethylidene-ammonium

These products are, generally speaking, white crystalline or microcrystalline powders, melting at rather low temperatures with incipient decomposition; sometimes they separate as oils or pitches, which by standing or by cooling will then crystallize.

They are little or not soluble in water but are generally soluble in common organic solvents. They have a tendency to decompose, particularly when heated, setting free the corresponding aldehydes. As a difference to other known ammonium salts they possess very little, if any, saline character.

We mention by way of example some of the products pertaining to this series obtained till now but it is obvious that this list is only illustrative and not exclusive and that many other compounds of this type can be prepared:

Dimethyldithiocarbamate of dimethylene - ammonium melting point 100° C.

Dimethyldithiocarbamate of diethylidene-ammonium melting point 48°–55° C.

Methyl - phenyl - dithiocarbamate of dimethylene-ammonium melting point 60° C. about Ethyl-phenyl-dithiocarbamate of dimethylene-ammonium melting point 60° C. about Ethyl-phenyl-dithiocarbamate of diethylidene-ammonium melting point 79° C.

Dibenzyl-dithiocarbamate of dimethylene-ammonium melting point 130°–133° C.

Pentametylene (piperidyl) dithiocarbamate of diethylidene ammonium.

They reveal their ultra-accelerating properties when used compounded with zinc oxide e. g. in a mixing consisting of 100 parts of rubber, 3 p. sulphur, 0.25 p. accelerator, 5 parts of zinc oxide.

It is to be understood that the above is only by way of example and that the proportions may be widely varied as desired according to the speed or the temperature at which it is desired to carry out the vulcanization, or according to the physical mechanical properties which it is desired to attain in the vulcanized article. By employing the above mixing, said accelerators give a complete vulcanization in 10 minutes at a temperature of 143° C.

Their tendency to scorching is like that of the analogous derivatives claimed in the preceding U. S. patent application No. 516,496 i. e. very slow.

It is to be understood that the above is referred to the vulcanization either mixings of pure rubber and sulphur, or of mixings containing zinc oxide and eventually the usual compounding ingredients and fillers such as reclaim, ground waste rubber, antioxidants and softening agents and the various mineral and organic ingredients commonly used in the rubber industry, and that the term "vulcanization of rubber" in the following claims is to be intended with this meaning.

What we claim is:

1. The process of vulcanizing rubber which comprises heating a mixture of rubber and a vulcanizing agent in the presence of an accelerator comprising a derivative of bisubstituted dithiocarbamates of quaternary ammonium bases in which the four hydrogen atoms of the ammonium group are substituted by two residues of an aliphatic aldehyde, formaldehyde included.

2. The process of vulcanizing rubber which comprises treatment of a mixture of rubber and a vulcanizing agent in the presence of an accelerator of the following general formula:

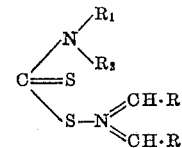

where $R_1$ and $R_2$ are monovalent radicals which may or may not be identical, and R represents hydrogen or an alkyl radical; each group CH·R thus comprising the residue from any aliphatic aldehyde.

3. A process for vulcanizing rubber which comprises treating a mixture of rubber and a vulcanizing agent in the presence of an accelerator of the following general formula:

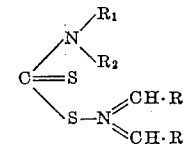

in which $R_1$ and $R_2$ represent organic radicals, and R represents hydrogen or an alkyl radical.

4. The process for preparing accelerators for use in the vulcanization of rubber mixtures, comprising interacting bisubstituted ammonium dithiocarbamates and aliphatic aldehydes, said aliphatic aldehydes including formaldehyde.

In testimony whereof we affix our signatures.

GIUSEPPE BRUNI.
TULLIO GUIDO LEVI.